Dec. 30, 1969 E. HABERKORN ET AL 3,486,716
VTOL AIRCRAFT
Filed Sept. 30, 1966 2 Sheets-Sheet 1
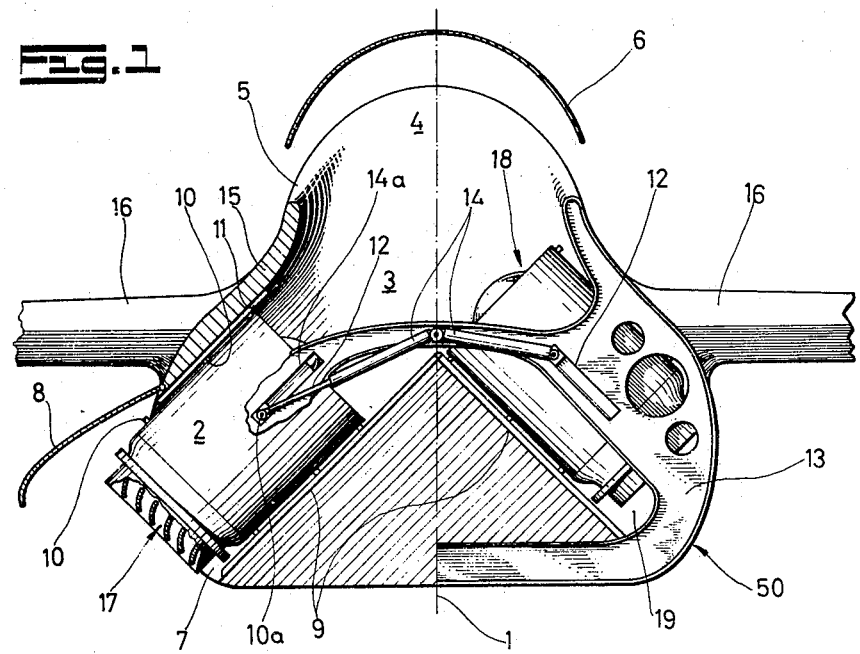
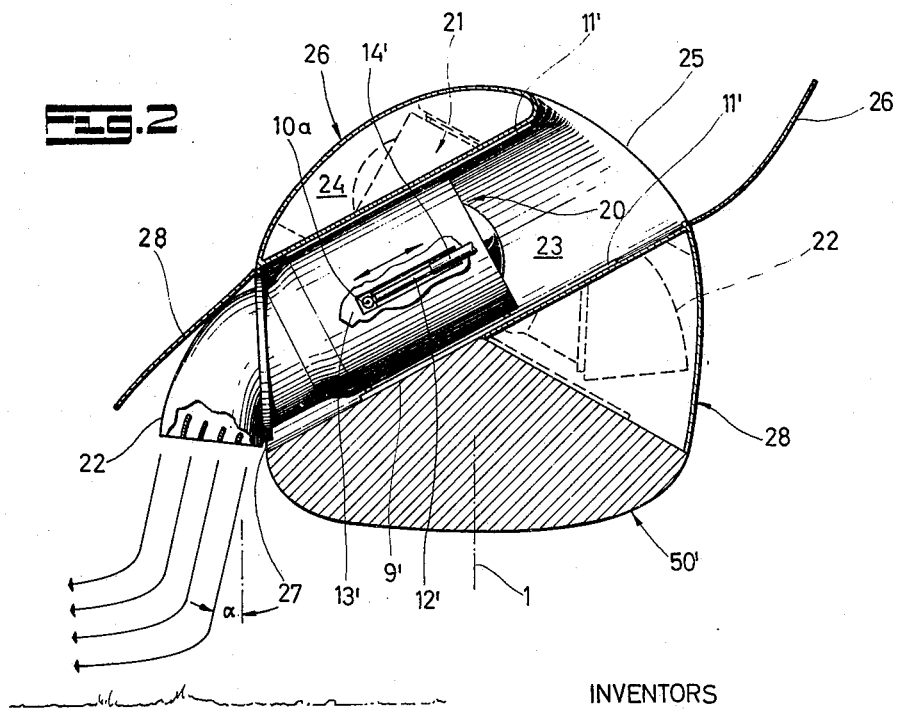
INVENTORS
Erich Haberkorn
Hans Rikus
By *Michaer and Toren*
ATTORNEYS

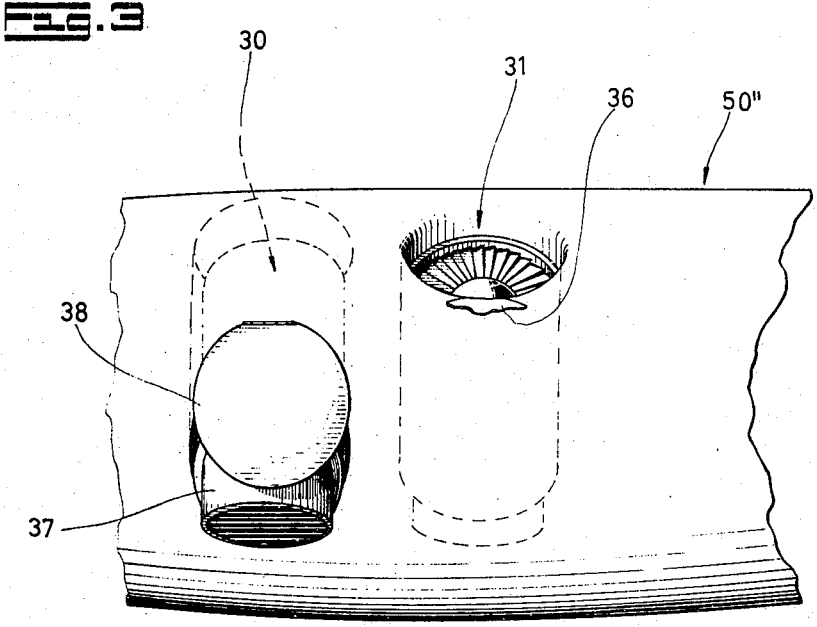
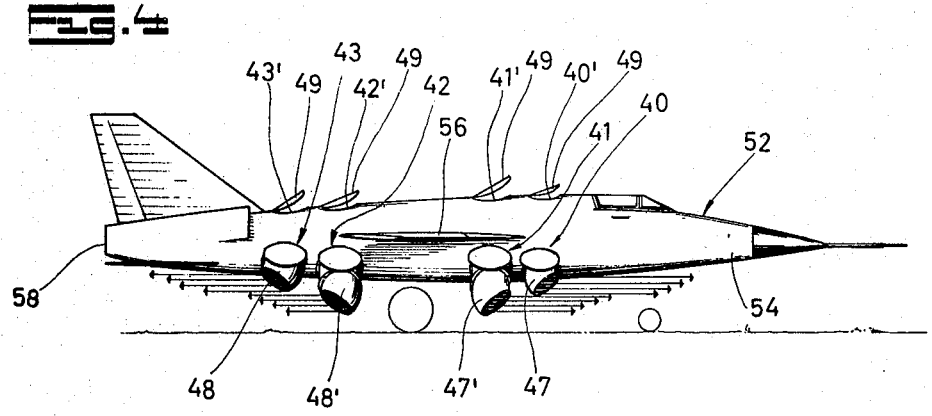

United States Patent Office 3,486,716
Patented Dec. 30, 1969

3,486,716
VTOL AIRCRAFT
Erich Haberkorn, Riemerling, and Hans Rikus, Ottobrunn, Germany, assignors to Bolkow Gesellschaft mit beschrankter Haftung, Ottobrunn, near Munich, Germany
Filed Sept. 30, 1966, Ser. No. 583,399
Claims priority, application Germany, July 19, 1966, B 88,063
Int. Cl. B64c 29/00
U.S. Cl. 244—12                 11 Claims

ABSTRACT OF THE DISCLOSURE

A VTOL aircraft comprises a fuselage having at least one pair of engine mounting shafts which extend therethrough at an angle to the longitudinal plane of symmetry and each of which carries a thrust engine which may be axially displaced in respect to its mounting shaft. A particularly stable and effective arrangemnet includes two pairs of lift thrust engines located adjacent the forward end of the wing structure and two pairs of lift thrust engines located adjacent the rear of the wing structure. The engines are arranged obliquely through the fuselage and opposite engines connect either separately or jointly centrally to the upper portion or top of the fuselage to an air inlet for the thrust engines.

---

This invention relates, in general, to aircraft construction and to engine arrangements therefore and, in particular, to a new and useful VTOL aircraft with lift engines arranged to extend through the fuselage thereof and advantageously arranged in pairs and inclined symmetrically.

As a rule, the lifting engines are operated only during the take-off and landing of the aircraft which is a short period of time in comparison to the total flight duration. A general tendency therefore is to arrange such engines so that in horizontal flight they offer the least possible air resistance. It is also necessary, however, for reasons of efficiency of operation to provide for favorable conditions for the entrance of the air and the expulsion of the thrust gases. The two requirements are best fulfilled by the installation of the lifting engines in the fuselage.

It has been proposed to install lifting engines in the fuselage, but the arrangements up to the present time have major disadvantages. The entire lifting engine system is arranged in a gondola below the actual fuselage. The fuselage is designed as a carrying structure. In order to reduce the lift losses and to avoid excessive ground erosion at the time of take-off or landing, the lifting nozzle openings must always have a minimum ground clearance. For this reason, the under carriage which must be secured to the carrying fuselage structure, either directly or through the airfoils, must be made correspondingly high off the ground. The additional gondola constructions add additional weight to the aircraft and they must be located so that they make loading of the aircraft difficult or impossible. A further disadvantage of the prior art constructions is that the air inlets of the lifting engines must lie in a zone which is adjacent the zone of the thrust gas discharges so that there is a tendency for the engines to re-intake these gases and thus suffer a considerable loss of output and efficiency. A further disadvantage of the prior art constructions is that the lifting engine nozzles must be arranged along the longitudinal plane of symmetry or at only a small lateral distance therefrom so that it is difficult to employ these engines for roll control due to the short lever arm through which the force of the thrust gases act because of the closeness to the longitudinal plane of symmetry.

In addition to the requirements for low cruising resistance and good efficiency of the installation for such lifting engines, it is often demanded, in particular for military aircraft, or for aircraft employed for agricultural or rescue purposes, that the underside of the fuselage should remain free for the suspension of external loads.

In accordance with the invention, there is provided a vertical take-off or landing aircraft (VTOL) in which the advantages of the arrangement of the lifting engine in the fuselage are coordinated with the requirement for an undisturbed fuselage underside and the requirement for control of the aircraft about all three axes by means of thrust modulation of the lifting engines. In accordance with the invention, the engines are mounted to extend through the fuselage and preferably at an angle so that the thrust nozzles are directed downwardly and outwardly. In the preferred arrangement, the engines are mounted so that they may be displaced along their longitudinal axes for extension out of the fuselage or for retraction into the fuselage. During cruising, the lifting engines are completely retracted into the fuselage contour so that they will offer very little, if any, drag resistance. Due to the inclined position of the engines, a large part of the fuselage cross section still remains utilizable for any carrying structure. In the preferred arrangement, they extend from an inlet opening, which is located adjacent the top or to one side of the top of the fuselage to a discharge opening which extends to a location adjacent the bottom of the fuselage but extending to one side of the aircraft so that the bottom surface of the fuselage may be left absolutely free. For this reason, the apertures through which the engines may be projected outwardly are located in the lower half of the right and left lateral walls of the fuselage leaving the fuselage undisturbed. The arrangement of the thrust nozzles is also such that they are spaced a suitable distance from the longitudinal axes to permit easy roll control by thrust modulation.

In accordance with one characteristic of the invention, two of the lifting engines are arranged in pairs side-by-side in a manner such that they have a common inlet adjacent the top of the air craft fuselage. In still another embodiment, the engines are arranged longitudinally offset and the shaft for accommodating the thrust engines extends substantially diametrically through the fuselage so that the air inlet is arranged at the upper half of the fuselage on one side and the engine exhaust is arranged at the lower half of the fuselage on the opposite side thereof. The installation shafts extend alternately proceeding along the longitudinal axis of the aircraft, for example, from the upper right to the lower left and from the upper left to the lower right.

For a grouping of the lifting engines combined in an airfoil zone, it is advantageous to locate the air inlets of the lifting engines above the plane defined by the airfoils or wings and the gas outlets are arranged below this plane. In this manner, the airfoils aid in preventing the lifting engines from taking in or recirculating the hot thrust gases which would be apt to cause considerable lifting thrust losses.

In accordance with another characteristic of the invention, the thrust nozzles are provided with devices by means of which the thrust vectors of the lifting engines can be deflected either singly or jointly into a desired thrust angle between the vertical and the horizontal and laterally to permit, for example, the thrust gases to be directed either forwardly or backwardly or even laterally as desired. By the forward and aft deflection of the thrust gases, the engines can be operated on the ground so that the gases will not cause undue gusting and lifting up of debris at the location of take-off and the hot gases will not be deflected to the intakes at the top of the fuselage.

In a preferred arrangement, two groups of the lifting engines may be arranged in front of and behind the aircraft wing and may be oriented so that the initial starting thrust is directed in outward opposite directions to neutralize each other in order to permit a warming up of the engines without disturbing the aircraft. In this arrangement, the lifting engines may be employed for supplementing the cruising engine and for facilitating changing over from hovering to horizontal flight or from horizontal flight and deceleration of the aircraft in the reverse process. The engines may be easily tested on the ground at full load conditions for harmonic operation and equal thrust output. This is done by arranging the engines at forward half of the aircraft to deflect the gases in one direction, say forwardly, and the engines at the trailing half to direct the gases in an opposite direction rearwardly. In this manner, the forces are ineffective in the vertical and cancel each other out in the horizontal. In addition, the danger of re-intake of hot gases or recirculation is substantially eliminated. After the engines are warmed up the nozzles may be pivoted to direct the thrust gases vertically in a minimum of time so that a recirculation field cannot build up below the aircraft and the full lifting thrust is thus available. The aircraft will take-off from any zone of harmful ground influences before these can adversely effect engine output.

In the preferred arrangement of the invention where two of the lift engines are arranged ahead of the wing structure and two behind the wing structure on each side of the aircraft, it is possible to arrange the deflecting elements for the thrust jets so that they do not interfere with each other and provide for a complete control of the aircraft. For example, when the jets are directed horizontally, two adjacent engines can be extended in a staggered manner so that the hot gas jet of one does not impinge on the thrust nozzle with the deflection device of the other, thereby avoiding damage and a thrust reduction due to the whirling of the thrust jet. In hovering, a roll control of the aircraft can be achieved without throttling by the displacement of the individual engines.

Accordingly, it is an object of the invention to provide an improved aircraft construction having lift engines arranged to extend through the fuselage.

A further object of the invention is to provide an improved mounting for a lift engine of an aircraft which includes a tubular shaft arranged to extend preferably obliquely through the fuselage of the aircraft and means for mounting the engine in the shaft to permit it to be shifted along its longitudinal axis.

A further object of the invention is to provide an arrangement of thrust engines in an aircraft which includes a central intake opening arranged at the top of the aircraft and two downwardly extending shafts extending from the common opening to opposite sides of the aircraft with means for mounting a thrust engine in each shaft in a manner permitting it to be shifted along its longitudinal axis.

A further object of the invention is to provide an aircraft having a plurality of lift engines arranged to extend through its fuselage and which includes means for adjusting the deflection of the thrust gases of such engines.

A further object of the invention is to provide an aircraft which includes a plurality of lift engines arranged to extend through the fuselage at a location ahead of the wing structure and a plurality of lift engines arranged to extend through the fuselage at a location behind the wing structure with means associated with each lift engine for varying the direction of the thrust gases.

A further object of the invention is to provide an aircraft having at least two lift engines arranged forwardly of the wing structure and at least two arranged adjacent the trailing end of the wing structure, and which are mounted in shafts which extend obliquely through the fuselage to provide an intake opening adjacent the top of the fuselage or on one side of the fuselage and wherein each of said thrust engines is provided with means for directing the thrust gases at a selected angle between the horizontal and the vertical for controlling both the roll forward and vertical speed of the aircraft particularly in initial lifting, hovering and transfer flight.

A further object of the invention is to provide an aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is an offset transverse sectional view of an aircraft having a thrust engine mounting constructed in accordance with the invention;

FIG. 2 is a view similar to FIG. 1, but with the engines arranged offset one behind the other;

FIG. 3 is a partial elevational view of the aircraft indicated in FIG. 2 with the engines arranged one behind the other; and FIG. 4 is a side elevational view of an aircraft having lifting engines arranged in two installational groups before and behind the wing.

Referring to the drawings, in particular, the invention embodied therein, as indicated in FIG. 1, includes a VTOL aircraft generally designated 50 having a plane of symmetry designated 1. The aircraft includes an airfoil or wing structure 16 on each side of the fuselage.

In accordance with the invention, the fuselage is formed with a central upper intake opening 4 leading downwardly to two separate shafts or engine mounting passages 3 and 19 which extend outwardly in opposite directions. A thrust engine 2 is mounted for axial displacement within the shaft 3 and a thrust engine 18 is mounted for axial displacement within the shaft 19. The inlet 4 is common to each of the enignes and the air inlet aperture 5 may advantageously be closed by a cover or flap member 6 when the engine is not in use. Each of the shafts 19 and 3 are closed at their outer lower ends by a flap or pivotal cover member 8. In this particular installation, the oblique walls designated 9 which bound the lower portion of the shafts 3 and 19, respectively, define a carrying shell therebelow which is not affected by the provision of the mounting shafts for the engines.

As indicated in FIG. 1, the engines 2 and 18 are guided by pins 10 and 10a which slide in bars 11 and cutouts 12 in the spars 13, respectively. A hydraulic actuating device 14 is pivotally connected at the pin 10a and includes an extensible rod portion 14a for moving the engines 2 and 18 along their associated shafts 3 and 19. The spar 13 provides a connection between the carrying fuselage portion 9 and the remaining fuselage parts, for example, the inflow lip 15, which is loaded by aerodynamic forces as well as the wings 16.

A deflecting device 17 is provided for each of the engines 2 and 18. The device 17 is mounted for rotation about the longitudinal axis of the associated engine for the purpose of changing the angle of deflection of the thrust gases. By rotating the deflector 17, the gases may be shifted from substantially vertically downwardly into a direction in which they extend substantially horizontally forwardly or backwardly or even pointing outwardly away from the fuselage.

In the embodiment indicated in FIG. 2, there is provided an aircraft generally designated 50' which includes lifting engines 20 and 21 installed in an offset manner one behind the other. The engine 20 is shown in a fully extended position in operation. The engine 21, which is indicated in dotted lines, is completely retracted into the fuselage. Each of the engines is provided with deflecting devices for the thrust gases 22 which are arranged to direct the jet downwardly during take-off at a small angle from the vertical indicated α in order to delay the building up of a recirculation field. Unlike the deflection device 17, indicated in FIG. 1, the deflection device 22 in FIG. 2 is rotatable in a vertical plane so that in the horizontal direction the full thrust becomes operative except for a small component caused by the angle α.

In the embodiment of FIG. 2, the motor shafts 23 and 24 extend substantially diametrically through the fuselage so that the respective inlets 25, 25 are arranged on the opposite sides of the fuselage from the engine exhaust apertures 27, 27. As indicated, an inlet flap 26 closes each inlet 25 and an adjustable closure flap 28 is provided for each exhaust opening 27. In the embodiment of FIG. 2, the engines 20 and 21 are mounted in a manner similar to that indicated in FIG. 1 and the corresponding operating parts have been similarly numerically designated but with the addition of a prime.

In FIG. 3 there is indicated a side view of an aircraft, generally designated 50", in which engines 30 and 31 are arranged one behind the other in an offset manner in a manner similar to that indicated in FIG. 2. In the embodiment of FIG. 3, the inlet aperture is provided with a closure flap 36 and the exhaust opening is provided with a cover flap 38. The engine 30 is provided with a thrust gas deflecting device 37 which is indicated in the left position in FIG. 3.

In the embodiment of FIG. 4, there is shown an aircraft, generally designated 52, which includes a fuselage 54 having a wing or airfoil 56 on each side. The aircraft 52 is provided with a cruising engine which is located to discharge thrust gases through a tail pipe 58 for cruising purposes.

In accordance with the invention, the aircraft 52 is also provided with lift engines arranged on each side of the fuselage in side-by-side pairs with the ones on the right side of the fuselage being shown in the drawing and designated 40, 41, 42 and 43 and with aligned corresponding engines on the opposite side (not shown). As indicated in the drawings, the gas jets of the front engine group 40 and 41 which is located ahead of the wing 56 are directed in a forward direction by orienting the deflection devices 47 and 47', as indicated. The deflection devices 48 and 48' of the trailing group of engines 42 and 43 are oriented, as indicated, to direct the thrust gases rearwardly. In this manner, the engines can be brought to full load, for example before take-off without loading the brakes of the aircraft or without the aircraft moving. By a common rapid opposite rotation of the deflecting devices 47, 47' and 48, 48' thrust may be directed in a vertical direction and the aircraft may be lifted off before a recirculation field can build up.

The thrust engines 40 and 41 and 42 and 43 advantageously share a common inlet 40', 41', 42' and 43' with the paired associate engine (not shown) which is located on the opposite side of the fuselage with the arrangement being similar to that indicated in FIG. 1. Covers 49 are provided for each of the intake openings.

As shown, the engines 41 and 42 or their deflectors 47' and 48' are extended further than the engines 40 and 43 so that the deflection means 47' and 48' will be lower than the deflection means 47 and 48 so that there will not be any thrust gas interference even when warming up prior to take-off.

While specific embodiments of the invention have been shown and described in detail to illustrate the application of the inventive principles, it will be understood that the invention may be embodied otherwise without departing from such principles.

What is claimed is:

1. A VTOL aircraft comprising, an aircraft fuselage, a wing extending outwardly from each side of said fuselage, said fuselage having a longitudinal axis of symmetry, at least one pair of engine mounting shafts defined through said fuselage and disposed at an angle to the longitudinal axis of symmetry and located adjacent the forward edge of said wing, at least one second pair of engine mounting shafts defined through said fuselage and disposed at an angle to the longitudinal axis of symmetry and located adjacent the trailing edge of said wing, a thrust engine mounted in an associated one of each of said shafts and having means for generating thrust gases with inlets adjacent the upper ends of the associated shaft and thrust gas discharges adjacent the lower ends, thrust gas deflector means associated with the discharge of each of said engines for directing the thrust gases at a selected angle between an angle extending between the vertical and the horizontal and also laterally of said aircraft, at least two pairs of additional thrust engines located adjacent the trailing end of said wing, the inboard ones of said additional thrust engines having exhaust deflector means which extend downwardly by an amount greater than the exhaust gas deflector means associated with the outboard ones of said engines in order to permit deflecting of gases by each of said engines without interference with the others.

2. A VTOL aircraft comprising, an aircraft fuselage, a wing extending outwardly from each side of said fuselage, said fuselage having a longitudinal axis of symmetry, at least one pair of engines mounting shafts defined through said fuselage and disposed at an angle to the longitudinal axis of symmetry and located adjacent the forward edge of said wing, at least one second pair of engine mounting shafts defined through said fuselage and disposed at an angle to the longitudinal axis of symmetry and located adjacent the trailing edge of said wing, a thrust engine mounted in an associated one of each of said shafts and having means for generating thrust gases with inlets adjacent the upper ends of the associated shafts and thrust gas discharges adjacent the lower ends, and thrust gas deflector means associated with the discharge of each of said engines for directing the thrust gases at a selected angle between an angle extending between the vertical and the horizontal and also laterally of said aircraft, at least one of said pairs of mounting shafts being arranged to intersect together at a common inlet opening located adjacent the top of said fuselage.

3. A VTOL aircraft comprising, an aircraft fuselage, a wing extending outwardly from each side of said fuselage, said fuselage having a longitudinal axis of symmetry, at least one pair of engines mounting shafts defined through said fuselage and disposed at an angle to the longitudinal axis of symmetry and located adjacent the forward edge of said wing, at least one second pair of engine mounting shafts defined through said fuselage and disposed at an angle to the longitudinal axis of symmetry and located adjacent the trailing edge of said wing, a thrust engine mounted in an associated one of each of said shafts and having means for generating thrust gases with inlets adjacent the upper ends of the associated shafts and thrust gas discharges adjacent the lower ends, thrust gas deflector means associated with the discharge of each of said engines for directing the thrust gases at a selected angle between an angle extending between the vertical and the horizontal and also laterally of said aircraft, means permitting axial displacement of said engines in each of said engine mounting shafts, there being at least two pairs of said thrust engines located adjacent the forward end of said wing and at least two additional pairs of thrust engines located adjacent the trailing end of said wing, the inboard ones of said thrust engines having exhaust deflector means which extend downwardly by an amount greater than the exhaust gas deflector means associated with the outboard ones of said engines in order to permit deflecting of gases by each of said engines without interference by the others.

4. A VTOL aircraft comprising, a fuselage having a longitudinal plane of symmetry and having at least one pair of engine mounting shafts defined therein extending through the fuselage, said shafts being disposed at an angle to the longitudinal plane of symmetry, a lift thrust engine mounted in each of said engine shafts with its inlet located adjacent one end of the associated shaft for taking suction through this end and their discharge located adjacent the opposite end for directing thrust gases outwardly, means defined along said shaft for permitting axial displacement of said engines therein, and means connected to said shafts and to said engines for displacing said engines axially along the associated shafts.

5. A VTOL aircraft comprising, a fuselage having a longitudinal plane of symmetry and having at least one pair of engine mounting shafts defined therein extending through the fuselage, said shafts being disposed at an angle to the longitudinal plane of symmetry, a lift thrust engine mounted in each of said engine shafts with its inlet located adjacent one end of the associated shaft for taking suction through this end and their discharge located adjacent the opposite end for directing thrust gases outwardly, thrust gas deflection means associated with each of said engines for deflecting the thrust gases selectively at an angle which may be varied between a substantially vertical direction and a substantially horizontal direction, means connected between said engines and said shafts for displacing said engines along said mounting shafts and being projectable outwardly through the discharge openings.

6. A VTOL aircraft, according to claim 4, wherein said pair of engine mounting shafts intersect adjacent their upper ends and define a common inlet at the upper end of said fuselage to which said engines are connected.

7. A VTOL aircraft, according to claim 4, including a wing defined to extend outwardly from each side of said fuselage, said mounting shafts being such that the inlets for said lifting engines lies above the plane defined by said wing while the outlets lie below this plane.

8. A VTOL aircraft, according to claim 4, including thrust gas deflection means associated with each of said engines for deflecting the thrust gases selectively at an angle which may be varied between a substantially vertical direction and a substantially horizontal direction.

9. A VTOL aircraft, according to claim 4, wherein said engine mounting shafts each have an opening at the top of said fuselage defining an inlet for the associated engine and include an opening on a side of said fuselage defining a discharge for said engine.

10. A VTOL aircraft, according to claim 8, wherein said gas thrust gas deflection means includes a rotatable thrust gas deflector on said engines, said deflector being rotatable about an axis substantially parallel to the axis of the associated engine for varying the direction in which the thrust gases are directed outwardly.

11. A VTOL aircraft, according to claim 8, wherein said thrust gas deflection means includes a rotatable thrust gas deflector carried by each of said engines, said deflector being rotatable out an axis substantially at right angles to the side of said fuselage.

References Cited

UNITED STATES PATENTS

| 3,217,490 | 11/1965 | Chilvers | 244—54 X |
| 3,065,936 | 11/1962 | Messerschmitt | 244—23 |
| 3,073,548 | 1/1963 | Marsh | 244—12 |
| 3,122,343 | 2/1964 | Leibach et al. | 244—23 |
| 3,153,906 | 10/1964 | Marchant | 244—23 X |
| 3,164,337 | 1/1965 | Hooper | 244—12 |
| 3,284,030 | 11/1966 | Medelung | 244—12 X |

FOREIGN PATENTS 974,330 11/1964 Great Britain.

MILTON BUCHLER, Primary Examiner

J. E. PITTENGER, Assistant Examiner

U.S. Cl. X.R.

244—23, 54, 55